Dec. 5, 1967  R. B. WIDTH  3,356,821
ARC ELIMINATING BALANCING ELECTRODE HOLDERS
Filed May 12, 1965
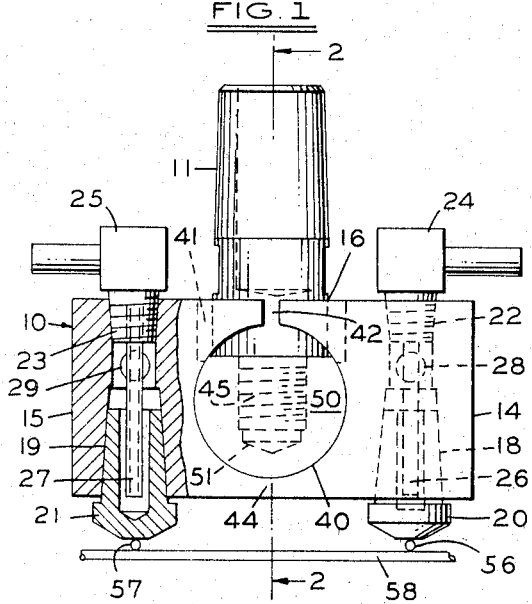
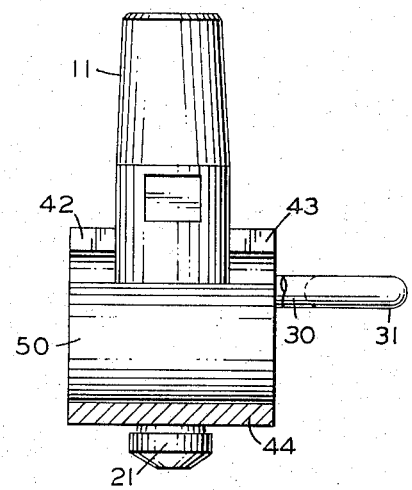
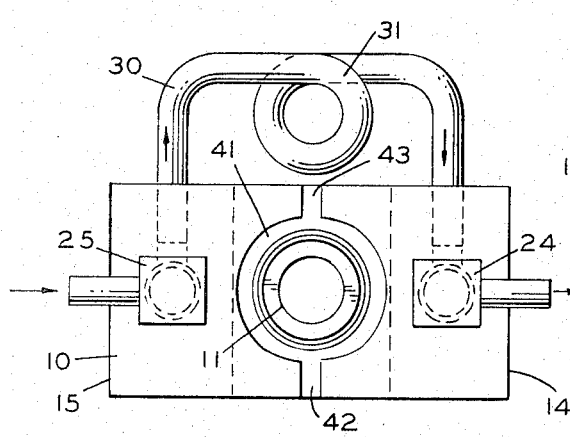
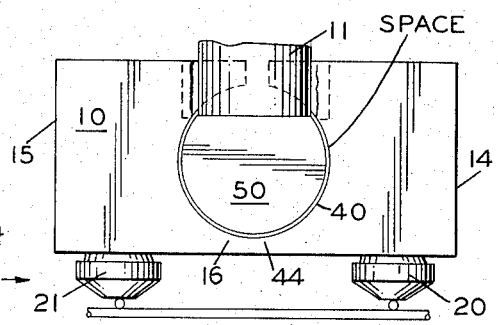
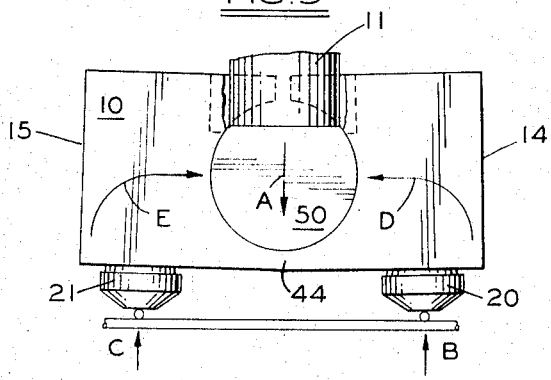
INVENTOR.
ROBERT B. WIDTH
ATTORNEY

United States Patent Office 3,356,821
Patented Dec. 5, 1967

3,356,821
ARC ELIMINATING BALANCING ELECTRODE
HOLDERS
Robert B. Width, 251 Randolph Road,
Rochester, Mich. 48063
Filed May 12, 1965, Ser. No. 455,103
1 Claim. (Cl. 219—120)

ABSTRACT OF THE DISCLOSURE

An electrode holder having a body equipped with a central socket having arcuate side walls receiving an arcuate pivot member normally in slight spaced relationship so that the body is freely swingably mounted and wherein the body is interrupted in its central socket location except for a flexible web intermediate its electrode holding opposite ends so that when the holder is advanced by a welding machine on which it is mounted toward a workpiece the electrodes initially contact the workpiece and swing the body to equalize electrode contact and with subsequent forced advancement the flexible web bends allowing the socket side walls to move against the pivot member in solid unspaced contact providing efficient welding current transmission therebetween thereby providing balanced contact and force conditions between the electrodes and the workpiece and eliminating arcing at the normally spaced pivoting parts.

---

This invention relates to electrode holders used in electrode resistance welding. The novel holder has a movable swing mounting having relatively moving parts for locating electrode tips in contact, balancing forced engagement, and compressing the relatively moving parts to eliminate intervening space to obviate arcing.

In electric resistance welding several types and kinds of equipment are employed. Whether simple welding gun or intricate machine, they all pass electric current through the workpieces to weld the workpieces together. For this purpose opposed electrodes are disposed on opposite sides of the workpieces. The opposed electrodes compress the workpieces between them prior to and during the application of current to transmit the current through the workpieces to effect the weld.

Thus a gun or machine may have a relatively large flat base electrode for locating and supporting the workpieces. The base electrode may be stationary or movable. To concentrate the current, electrode tips are used in opposition to the base electrode. Several tips may be used to make several welds at the same time. The quality of the several welds depends on the quality of electrical contact between each tip, the workpieces, and the base electrode. The quality of the electrical contact in turn depends on the forced engagement of the electrode tips compressing the workpieces between themselves and the base electrode.

In one of several tips is not in forced engagement no weld or a poor weld is made. If one of several tips is in better forced engagement, too much current concentrates and the weld is burned. It is therefore necessary to balance the forced engagement of the welding tips. A balancing holder is used for this purpose.

While balancing holders of the prior art may be advantageous for the mentioned purpose, they introduce disadvantages in themselves as they complicate the operation relative to passing current through their relatively moving parts without arcing and providing coolant fluid to the electrode tips. Thus the balancing holders of the prior art in solving one problem create additional problems which heretofore are attempted to be solved by various additional means. However the added means render the holders complicated, difficult to manufacture, unhandy to use, expensive, cumbersome, difficult to cool, and involved in operation leading to arcing between their relatively moving parts.

With the foregoing in view, it is a primary object of the invention to provide a balancing electrode holder for mounting a plurality of electrode tips which is simple in design and construction, easy to manufacture, inexpensive, handy to use, streamlined, easy to cool, and simple in operation leading to eliminating arcing between its relatively moving parts.

An object of the invention is to provide a balancing electrode holder which moves easily to balance the tips in substantially equal forced contact with the workpieces and which then compresses the moving parts together in unspaced contact to provide good electrical current transmission without arcing.

An object of the invention is to provide a body having a socket constituting a bearing and a member movably lying in the socket wherein the body has at least one separation and an inter-connecting web portion at the socket so that the body may flex at the socket under applied force and compress the relatively movable parts eliminating the spaced relationship of the socket and moving member thereby obviating arcing in the holder itself and also providing the equivalent of solid part electrical communication and transmission.

An object of the invention is to provide simple electrode tip cooling means in the body and also to provide simple cooling means at the relatively movable parts.

These and other objects of the invention will become apparent by reference to the following description of a novel balancing electrode holder embodying the invention taken in connection with the accompanying drawing, in which:

FIG. 1 is a side elevational view, partly in cross-section to show interior structure, of a balancing electrode holder of the invention and also showing welding tips, coolant fittings, and workpieces.

FIG. 2 is a cross-sectional view of the holder of FIG. 1 taken on the line 2—2 thereof showing the flexible web portion.

FIG. 3 is a top plan view of the holder of FIG. 1 showing a coolant shunt tube in more detail.

FIG. 4 is a diagrammatic view of the holder showing the spaced relationship of the moving parts with exaggerated spacing for illustrative purposes; and FIG. 5 is a diagrammatic view of the holder showing the flexing of the holder in compressing the moving parts to an exaggerated degree for illustrative purposes to eliminate space between the relatively moving parts.

Referring now to the drawing wherein like numerals refer to like and corresponding parts throughout the several views, the balancing electrode holder disclosed therein to illustrate the invention comprises a pivot member such as journal or a ball and a body swingably mounted on the pivot member. The body has arcuate walls defining a socket or bearing engaging the pivot member. Normally the body and the pivot member are in slight spaced relationship allowing the body to swing relatively freely on the pivot member. The body has means for supporting welding electrode tips on either side of the pivot member in opposite ends of the body and means for circulating coolant fluid to the welding tips. The pivot member has means for mounting the device on a welding machine or gun. The opposite ends of the body are joined by a flexible web portion below the pivot member. When advanced toward the workpiece, the body swings on the pivot members to balance the engagement of the welding tips with the workpieces. Upon further advancement, the body flexes in the web portion and the arcuate walls of the body constituting the socket or bearing portion move toward the pivot member eliminating the space between them to compressively engage the pivot member.

More particularly, the device comprises a body 10 and mounting means which may be a shaft 11. The shaft 11 may be tapered to fit in a head of a machine or gun. The shaft 11 may be hollow as indicated by the dotted line for circulating coolant fluid. The shaft 11 supports the body 10 in a machine or gun. The body 10 has opposite end portions 14 and 15 and a central intermediate portion 16. The end portions 14 and 15 each have at least one hollow bore 18 and 19 respectively. The bores 18 and 19 receive and support the electrode tips 20 and 21 respectively. The welding tips 20 and 21 may be hollow. The opposite ends 14 and 15 are also equipped with threaded apertures 22 and 23 leading to the bores 18 and 19 respectively. Fluid conducting fittings 24 and 25 are threaded in the apertures 22 and 23 respectively. The fittings 24 and 25 may have tubes 26 and 27 respectively for circulating fluid within the hollow tips 20 and 21 respectively. The opposite ends 14 and 15 also have apertures 28 and 29, which may be threaded if desired, for circulating fluid. A shunt tube 30 may lead between the aperatures 28 and 29 and have a coil 31 allowing changes in distance between the opposite ends 14 and 15 at the shunt tube 30 in flexing.

The intermediate portion 16 of the body 10 has arcuate walls defining a bearing portion or socket 40. The socket 40 may be cylindrical as shown. The body 10 is provided with a hollowed out portion 41 adjacent the shaft 11. The body 10 is separated at its top adjacent the shaft 11 by slots 42 and 43. Thus the slots 42 and 43 and the socket 40 in the intermediate portion 16 of the body 10 separate the opposite ends 14 and 15. A relatively thin web 44 at the bottom of the body 10 in the intermediate portion 16 inter-connects the opposite ends 14 and 15. An arcuate walled pivotal member such as the partially cylindrical journal 50 lies in the socket 40. The journal 50 has a threaded aperture 51 in the location of the body hollowed out portion 41. The shaft 11 has a threaded stub 45 threaded in the aperture 51 of the journal 50.

In the embodiment shown in FIGS. 1, 2 and 3, coolant fluid may be introduced through the filling 24 and tube 26 to the electrode 20. The fluid is then channeled out through the aperture 28 and shunt tube 30 to the aperture 29. The fluid then circulates up through the tube 21 and is evacuated through the fitting 25. A circulation tube, similar to the circulation tubes 26 and 27 may be used in the hollow shaft 11 if desired. Thus only two coolant hoses are needed to furnish and evacuate coolant fluid. This clears the holder of entangling multiple hoses to each electrode tip.

The holder is mounted in a machine or gun by forcing the tapered shaft 11 into the receiving head or spindle. Other mounting means may be used if desired. This electrically connects the holder in the welding machine or gun electrical circuit. Workpieces 56, 57, and 58 are supported on the mating electrode (not shown) in the machine or gun. This may be a platen type electrode.

In operation, the holder is advanced toward the workpieces 56, 57, and 58. One electrode tip 20 or 21 makes first contact with the workpiece 56 or 57 respectively. Upon the holder being further advanced, the electrode first in contact with a workpiece causes the body 10 to pivot or swing on the journal 50 to place the other electrode in contact with the other workpiece.

Upon further advancement of the holder, the body balances the applied force between the two electrode tips 20 and 21 and the workpieces 56 and 57 respectively.

With further advancement of the holder, the body continues to balance the applied force between the electrode tips and the workpieces and the body 10 flexes slightly in the web portion 44 below the journal 50. Upon the body flexing in the web portion 44, the opposite ends 14 and 15 swing relatively upwardly and inwardly and move the arcuate walls of the socket 40 into forced metal-to-metal contact with the journal 50. This is permitted by the socket 40 itself, the slots 42 and 43, and the hollowed portion 41 around the shaft 11. This eliminates any space gap between the journal 50 and the body 10. Welding current is now fed to the electrodes and the workpieces are welded.

FIG. 4 diagrammatically illustrates the spacing between relatively movable parts such as the journal 50 and the socket 40 of the body 10. This space is exaggerated in the showing for illustrative purposes. The space may be small or large but in an electrical system any space creating a gap causes the current to arc past the gap. This not only disrupts the current flow and destroys its otherwise smooth characteristics but the arc itself is erosive and causes pits and deposits on the parts themselves. This pitted or deposited surface on moving parts obstructs their movement. The oxidation products in the pits and deposits also reduces the electrical conductive ability of the parts. Thus spaced parts not only prevent proper flow of welding current producing unsatisfactory welds but also are destructive of the equipment itself. This destructive space-gap of the moving parts illustrated in FIG. 4 is eliminated in the novel device of the invention by flexing the body 10 as shown in FIG. 5.

FIG. 5 diagrammatically shows the body 10 fixed in the web portion 44 under the force applied by the machine or gun through the journal 50. This showing is exaggerated for illustrative purposes. Actually the flexing is so small as normally to be imperceptable. The applied force is applied in one direction to the body 10 by the journal 50 as illustrated by the arrow A. This applied force is resisted by the electric tips 20 and 21 in contact with the worpieces in the opposite direction as indicated by the arrows B and C. The web portion 44 lies between the applied force and the reaction force and flexes under them. Upon the web portion 44 flexing, the ends 14 and 15 of the body 10 swing inwardly on the web portion 44 toward the journal 50. This is indicated by the arrows D and E. The end portions 14 and 15 thus eliminate the space between their arcuate socket walls and the journal 50 and they move into compressed contact with the journal 50. This eliminates space-gap arcing between the relatively moving parts of the holder and provides excellent electrical contact for conducting welding current through the holder.

In operation, the novel holder first relatively freely swings to balance the electrode tips in balanced contact with the workpieces via its relatively movable parts. The novel holder then compresses its relatively movable parts in compressed metal-to-metal contact for conducting the current to make the welds. After the welds are made, the body 10 is retracted and the applied engaging force removed. The body now again swings relatively freely to balance the electrode tips relative to the next welds.

The novel electrode holder with the features disclosed and described constitutes a compact, durable, neat appearing, unobstructed, simple, efficient, high quality yet inexpensive device for making high quality welds at a plurality of points on a workpiece at the same time.

While only a single embodiment of the invention has been shown and described in detail, it is obvious that many changes may be made in the size, shape, detail, and arrangement of the various parts of the invention within the scope of the appended claim.

I claim:

A welding electrode holder for mounting a plurality of electrodes, wherein the holder body is freely pivotally mounted to equalize contact and force between the electrodes and a workpiece and wherein a portion of the holder body is flexible in the location of its pivoting parts to allow bending the body into forced solid contact at the pivoting parts to efficiently conduct welding current, comprising mounting means for securing the holder on a welding machine, an arcuate fulcrum pivot member secured on said mounting means, a balance beam body having opposite ends and a relieved central intermediate socket portion having arcuate side walls receiving said pivot member swingably inter-connecting said body and said pivot member with each other;

said relieved central intermediate portion interrupting said body between said opposite ends except for a thin flexible web inter-connecting said opposite ends;

said pivot member lying between said mounting means and said flexible web so that force imposed by said mounting means on said pivot member is transferred by said pivot member to said flexible web; and electrode attaching means on said opposite ends for securing electrodes on said body;

said pivot member and said socket portion being normally slightly spaced for free swinging movement;

said welding electrode holder being so constructed that when a welding machine advances said holder toward a workpiece with advancing force the force is applied between said ends of said body so that the electrodes on said ends contact the workpiece and swing said body on said pivot member to locate the electrodes in balanced contact with the workpiece and then with further advancing force being applied between said opposite ends causing said flexible web to bend moving said body socket portion arcuate side walls toward and into solid forced unspaced contact with said arcuate pivot fulcrum member providing solid electrical connection between the normally spaced pivoting parts of the holder.

UNITED STATES PATENTS

References Cited

| | | | |
|---|---|---|---|
| 2,389,946 | 11/1945 | Wisher | 219—120 |
| 2,979,599 | 4/1961 | Width | 219—87 |

RICHARD M. WOOD, *Primary Examiner.*

W. D. BROOKS, *Assistant Examiner.*